(12) United States Patent
Hanbli

(10) Patent No.: US 7,125,485 B2
(45) Date of Patent: Oct. 24, 2006

(54) WATER COOLER/WATER PURIFICATION SYSTEM

(76) Inventor: Jamel Hanbli, Cite Ezzouhour 2052, P.O. Box 23, Tunis (TN)

( * ) Notice: Subject to any disclaimer, the term of this patent is extended or adjusted under 35 U.S.C. 154(b) by 212 days.

(21) Appl. No.: 10/437,068

(22) Filed: May 14, 2003

(65) Prior Publication Data

US 2003/0213755 A1    Nov. 20, 2003

Related U.S. Application Data

(60) Provisional application No. 60/379,764, filed on May 14, 2002.

(51) Int. Cl.
*B03C 1/00* (2006.01)

(52) U.S. Cl. .................. 210/104; 210/128; 210/149; 210/175; 210/295; 210/192; 222/146.6

(58) Field of Classification Search ............... 210/149, 210/192, 742, 748, 764, 103, 104, 128, 175, 210/295; 250/436; 422/186.3, 24
See application file for complete search history.

(56) References Cited

U.S. PATENT DOCUMENTS

| 5,316,673 | A | * | 5/1994 | Kohlmann et al. | .......... 210/251 |
| 6,042,720 | A | * | 3/2000 | Reber et al. | .................. 210/85 |
| 6,090,281 | A | * | 7/2000 | Buckner | ..................... 210/205 |
| 6,139,726 | A | * | 10/2000 | Greene | ......................... 210/94 |
| 6,767,453 | B1 | * | 7/2004 | Lifschitz | ...................... 210/85 |

* cited by examiner

*Primary Examiner*—Terry K. Cecil
(74) *Attorney, Agent, or Firm*—Birch, Stewart, Kolasch & Birch, LLP

(57) ABSTRACT

A water cooler/water purification station that is portable, and small in size that is capable of cooling and purifying about 8 to 15 liters of water per hour between 3 to 10° C. The water cooler/water purification station is equipped with an ultra-violet lamp which serves to kill bacteria in stagnant water. A removable kit is positioned in the top of the housing. The Kit includes various sensors, as well as, the UV lamp and an exit passageway 70 for treated water.

6 Claims, 6 Drawing Sheets

WATER COOLER/WATER PURIFICATION SYSTEM

CROSS-REFERENCE TO RELATED APPLICATIONS

The present nonprovisional application claims priority under 35 USC 119(e) to U.S. Provisional Patent Application No. 60/379,764 filed on May 14, 2002 the entire contents thereof is hereby incorporated by reference.

BACKGROUND OF THE INVENTION

Field of the Invention

The present invention relates generally to a water cooler and water purification system and more particularly to a portable water cooler purifying and germicidal disinfecting system that utilizes ultraviolet radiation to prepare water for human consumption.

SUMMARY AND OBJECTS OF THE INVENTION

The present invention is directed to a refrigerated water cooler/water purification system for domestic and commercial use. A specially designed water cooler is disclosed for providing health and safety benefits over conventional water coolers. Natural water supplies can be contaminated by any number of disease-carrying microorganisms, from bacteria to protozoa to viruses. Consuming water that contains theses organisms can lead to cramps, vomiting, diarrhea and even more serious medical problems. For water to be safe to drink, these micro organisms must be either rendered inactive or removed.

There exists a need for portable water treatment systems for providing water suitable for human consumption at remote locations. This need exists, for example in rural areas where sophisticated water treatment facilities are not present, and in the aftermath of disasters such as earthquakes and hurricanes where the local water supply has been contaminated or disrupted. While enjoying recreational activities of extended periods of time, such as hiking or camping, there is a need for water to be purified in relatively small quantities. In these instances, some effective method of treating local water supplies becomes necessary. For the conventional water coolers refrigeration systems, compression systems are used massively, this product benefits from a remarkable flexibility since it can use several systems of refrigeration such as a compression system, a thermoelectric system or an absorption system (NH3).

Alternating current may be used as a source of energy. In addition, the present invention may utilize continuous current captured by the solar energy or through an adapter of 110 or 220 volts to 12 volts or 24 volts.

Generally filters are installed in the rear portion of standard refrigeration systems. The present invention provides a filtration system that is inserted in a refrigeration system of a small size.

The present invention also provides a particular design that hides and shelters the station. The present invention provides a future aquamachine that should be present in all homes. This same station can be used for other solutions, for example it can be used to nourish the specific ice cubes production kit so that we don't use a complete ice cubes maker machine because it provides pure and cool water, this cool water can be used in the said kit to produce ice cubes for an energy saving.

It is an object of the present invention to provide a water cooler/water purification system that is portable, small in size and provides flexibility to convert the water cooler/water purification system for use with other supplies of water. This small water cooler would be fabricated primarily from plastic and stainless steel components and which would be capable of cooling about 8 to 15 liters of cold water per hour, according to the temperature of the water in the entrance and according to the ambient temperature. The significant point differentiation for this device is the incorporation of an ultraviolet lamp that would function as a means of eradicating any bacteria that might be present in the water, particularly if it has become stagnant. This then, would assure that the water consumed from this cooler would be fully safe to drink. In addition, the cooler would be easy to install and would function in an energy saver manner.

Furthermore, the present invention permits a manufacturer to use different shapes of the housing of the water cooler station, it can be circular as, shown in the figures hereinafter, or rectangular, or square, etc. . . .

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which represents the exact parts of the invention.

DETAILED DESCRIPTION OF THE EMBODIMENT

A portable water cooler/water purification station that is small in size. The water cooler station is for refrigerating water that can support optionally all systems of water treatment, such as sediment filter, carbon media filter, removable ultraviolet lamp filtration having the ability to hunt and to destroy resistant bacteria in stagnant water. It is necessary to note that the particularity of the portable water cooler station is to assure the objective of water refrigeration and purification inside the cabinet.

The present invention can also be equipped with a compression cooling system that functions with either continuous current of 12 volts or 24 volts or alternating current while utilizing an automatic adapter for 110/12 volts or 110/24 volts, 220/12 volts, 220/24 volts. The present invention is very useful for use by individuals and by the military.

Another interesting point is that the continuous current can be extracted from solar energy for the conventional refrigeration systems, compression systems are used massively, this product benefits from the remarkable flexibility since the invention can use several systems of refrigeration such as a compression system, a thermo-electric system or an absorption system (NH3), etc.

The present invention possesses the advantage to be generic and may be formed in several geometric shapes, such as round, square, or rectangular shapes, etc. while preserving of the principle of the present invention.

Figure 1:
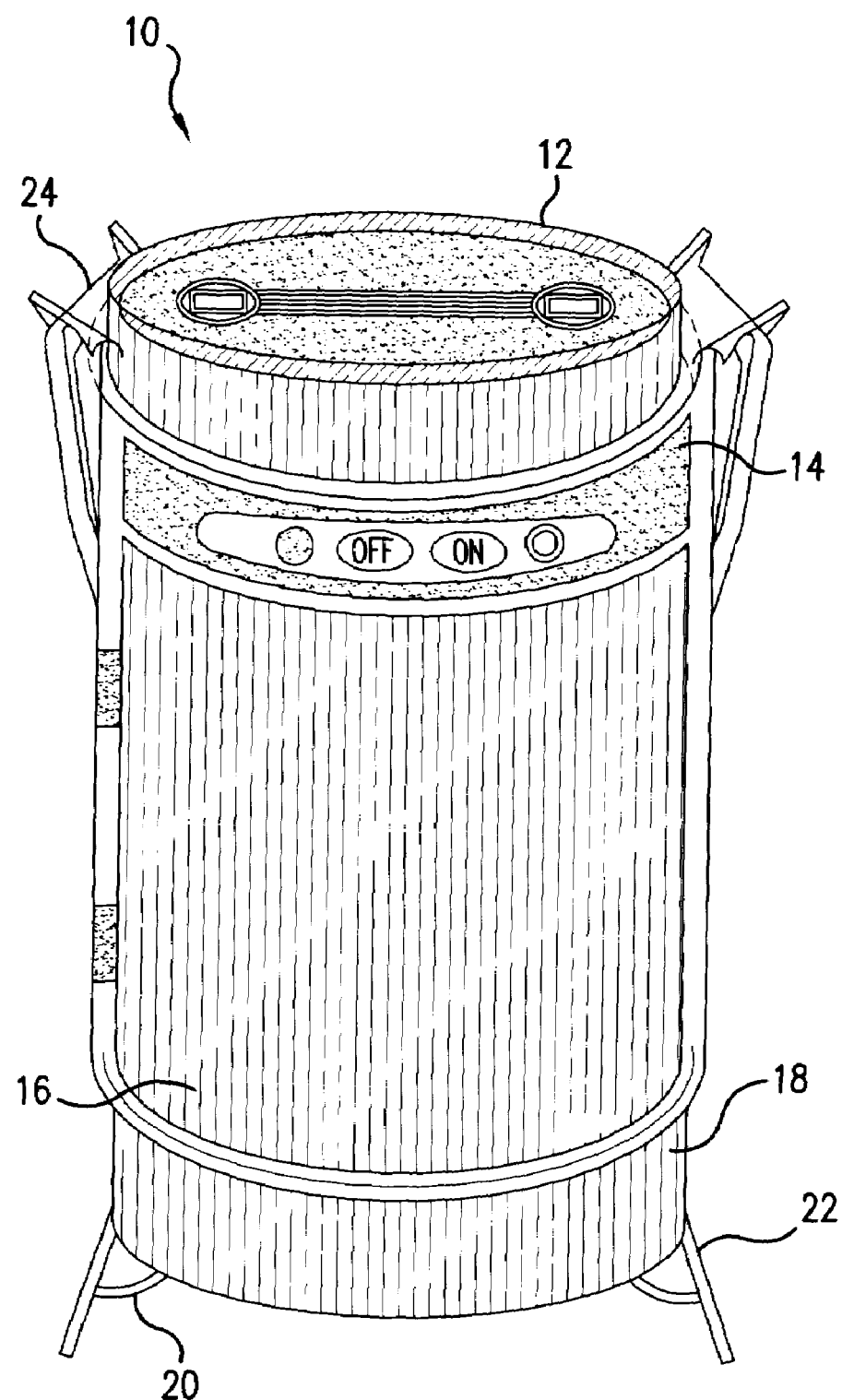
FIG. 1 is a front perspective view of the design of the housing for the water cooler station.
Figure 2:
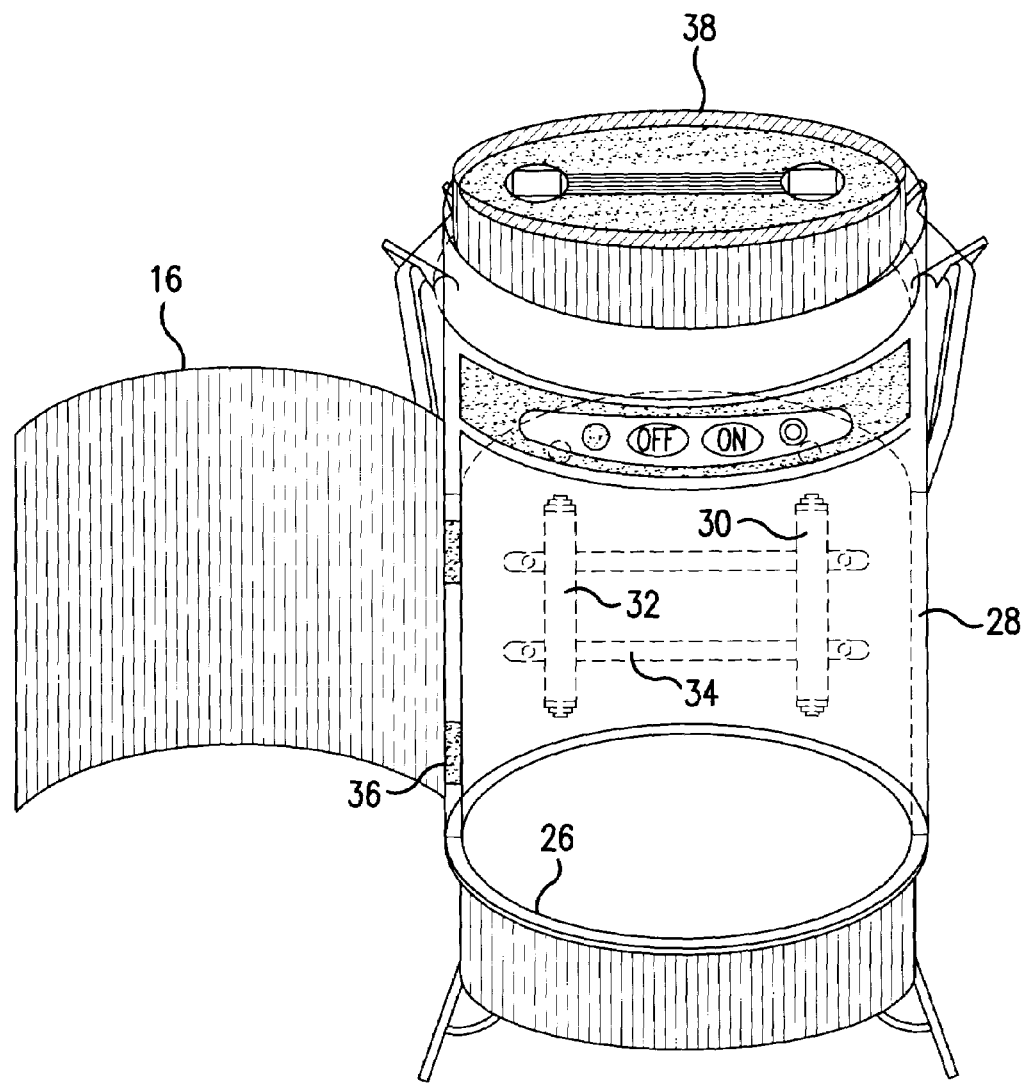
FIG. 2 is a front perspective view of the open door housing for the water cooler station showing the filtration system of the water cooler station.

The portable water cooler station has also the ability to provide mineral conditioned cool water from either the water of the city or water stored in reservoirs and activated by a pump. Optionally, we can use mineral water conditioned in bottles (18 liters (5 gallons) and 12 liters (3 gallons)), and at that time it's not necessary to pass it by the system of filtration, because it's already purified so it must be conducted directly to the room of sterilization which is protected by an ultraviolet lamp to avoid the growth of bacteria and to keep the mineral water in very good condition. First referring to FIG. 1, a portable water cooler/water purification station according to the present invention is shown. The portable water cooler/water purification station 10 includes a removable lid 12, a hinge 24 that attaches the lid to the station 10, a removable control board 14, a closed door 16 that is also shown in FIG. 2 in an opened state. The station 10 contains also a bottom 18 that handles all the station 10, and a mechanism in plastic 20 for opening and closing of the feet of the station 22.

Figure 3:
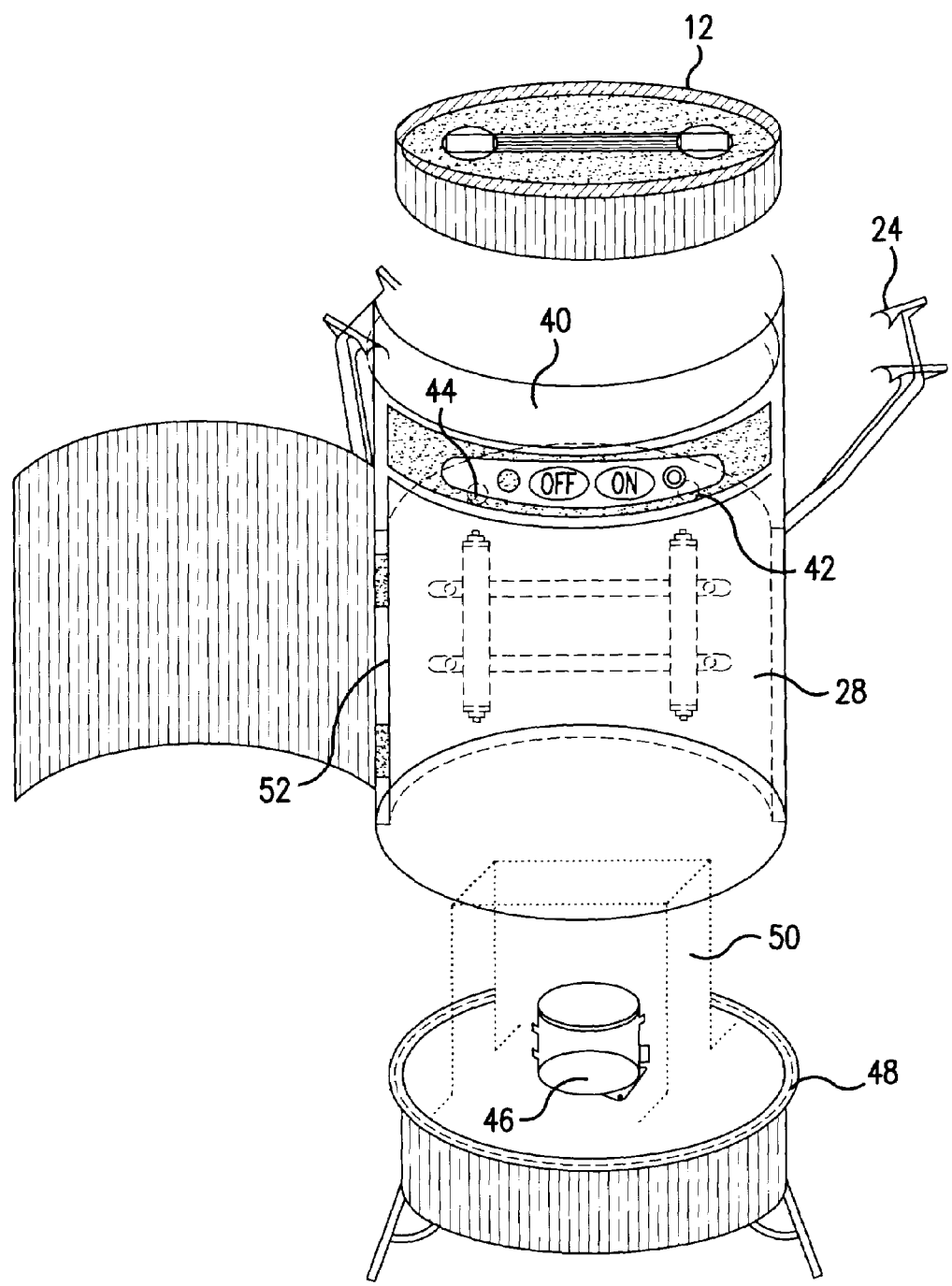
FIG. 3 is a front perspective view of the partially disassembled water cooler station.

In FIG. 2, the door 16 opens and is always attached to the station 10 by two hinges 36 whose axis 52 is shown in FIG. 3. A sediment filter 30 and the carbon media filter (0.5 microns) 32 and the metallic attachment 34 for the two filters are also shown. All these are attached to a removable plastic piece 28. Another metallic piece 26 is a reinforcement for the bottom 18 that is already shown in the FIG. 1. The filters also provide a reverse osmosis filter in case of polluted water.

Figure 4:
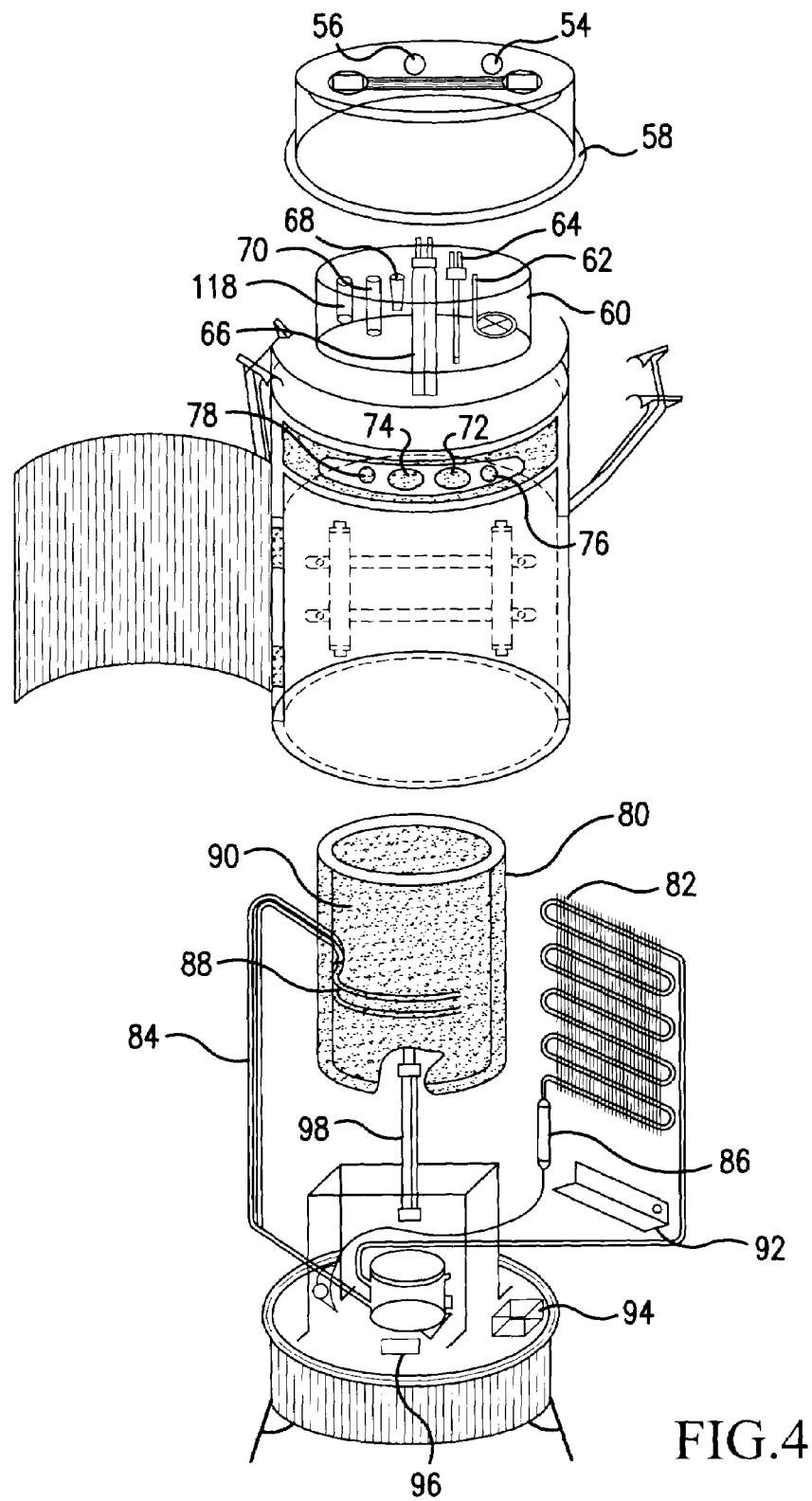
FIG. 4 is a front perspective view of the disassembled water cooler station, the refrigeration system, and the complete branching kit with different components.
Figure 5:
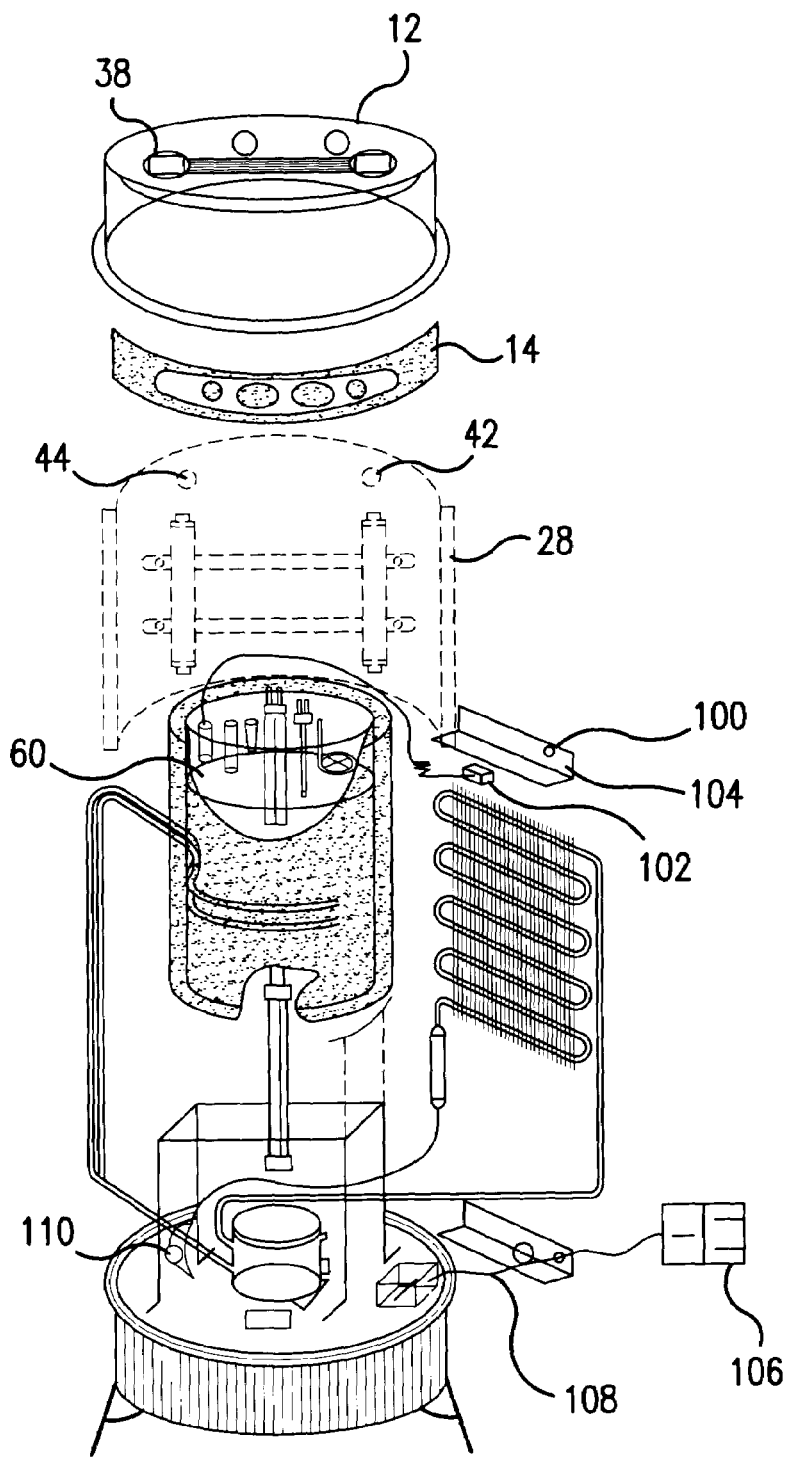
FIG. 5 is a front perspective view of the disassembled water cooler station electrical components, control board, refrigeration kit, and the purification kit that is incorporated in the tank reservoir.

In FIGS. 3 4 and 5, the station 10 is partially disassembled with the lid 12 having a handle 38, the cabinet 40, the hinge 24 and the bottom 18. The support 50 handles the complete tank 80. Two holes are provided for the passage of the tubing. The hole 42 is for the entrance of the water and the hole 44 for the exit. The groove 48 is used for the fixing of the cabinet 40. In FIG. 3 the compressor 46 is the principal piece in the cooling process. In FIG. 4, the different parts of the present invention are disassembled, these parts are the cold producing unit, the complete kit 60, the cabinet 40 and finally the lid 12. The cold producing unit consists in the compressor 46 functioning with a supply of ⅛ HP-12 volts or 24 volts (continuous current) or 110 volts or 220 volts (alternating current obtained with a converter). Insulation is provided for the complete reservoir 90, the complete reservoir 80, the copper tube 88 that indicates the evaporator of the machine in serpentine shape, the refrigerating gas tube 84 which is insulated and attached to the compressor 46. The tube 98 is plastic or steel for assuring the periodic drainage of the machine. The transformer 96 of 12 volts is for the alimentation of the ultraviolet lamp in the case where a compressor is used for functioning with alternative current 110 volts 220 volts. The static condenser 82 in brassy iron line for the condensation of the refrigerating gas. The filter 86 is used to dehydrate the refrigerating gas 10 grams. The metallic piece 92 is used for fixing the compressor, the condenser and the electric cord. FIGS. 4 and 5 illustrate the complete electrical unit 94 and the capillary tube 110. The cabinet 40 already shown in FIGS. 3 and 4 includes an OFF button 74 that stops the machine, the ON button 72 that activates the machine, the green luminous color button 76 indicates that the ultraviolet lamp is working. The red color luminous button 78 indicates that the ultraviolet lamp is not working. In the case where the two buttons are illuminated together, it is necessary to verify the lamp to possibly change it. The kit 60 is the main kit for the direct branching of water, it has been innovated comparing to the standard version where there is only predisposition for the entrance of water, the water evacuation is not foreseen.

The kit 60 is manufactured in plastic in double partition, it is plugged into the reservoir 80, and it includes a mechanical float 62, the sensor 64, the UV lamp 66 of 15 watts strength, the evacuation of air 68, the exit of the pure and cool water 70 and a probe for the entrance of the bulb thermostat 118. The present invention provides a kit for handling all these components that can be easily disassembled as well as permitting the components to easily be replaced. FIGS. 4 and 5 provide a groove 58 that is predisposed for the fixing of the hinge 24 with the cabinet 40, the main entrance of water 54 and finally the exit of water 56. In FIG. 5, the functionality of the cooling system where the kit of water purification is inserted in the reservoir 80, the refrigeration is made by the application of a refrigerating system based on the compressor 46 that has the strength of ⅛ HP. The condenser 82 is static, it cools to the ambient air. The condenser 82 is mounted on the metal support 100. For the tropical climates, we can use a condenser functioning with forced ventilation in the same concept as the present invention. The adapter 106 helps the machine to function with alternating current. In fact the adapter transforms the 110 volts or the 220 volts to 12 volts or 24 volts. The control of desired temperature is assured by the thermostat 102.

In another way, the total control of the two cycles of the purification and the refrigeration can be assured by a microprocessor that can be installed on the present invention. The evaporator 88 is in direct contact with the reservoir constructed of steel or plastic and placed outside.

Figure 6:
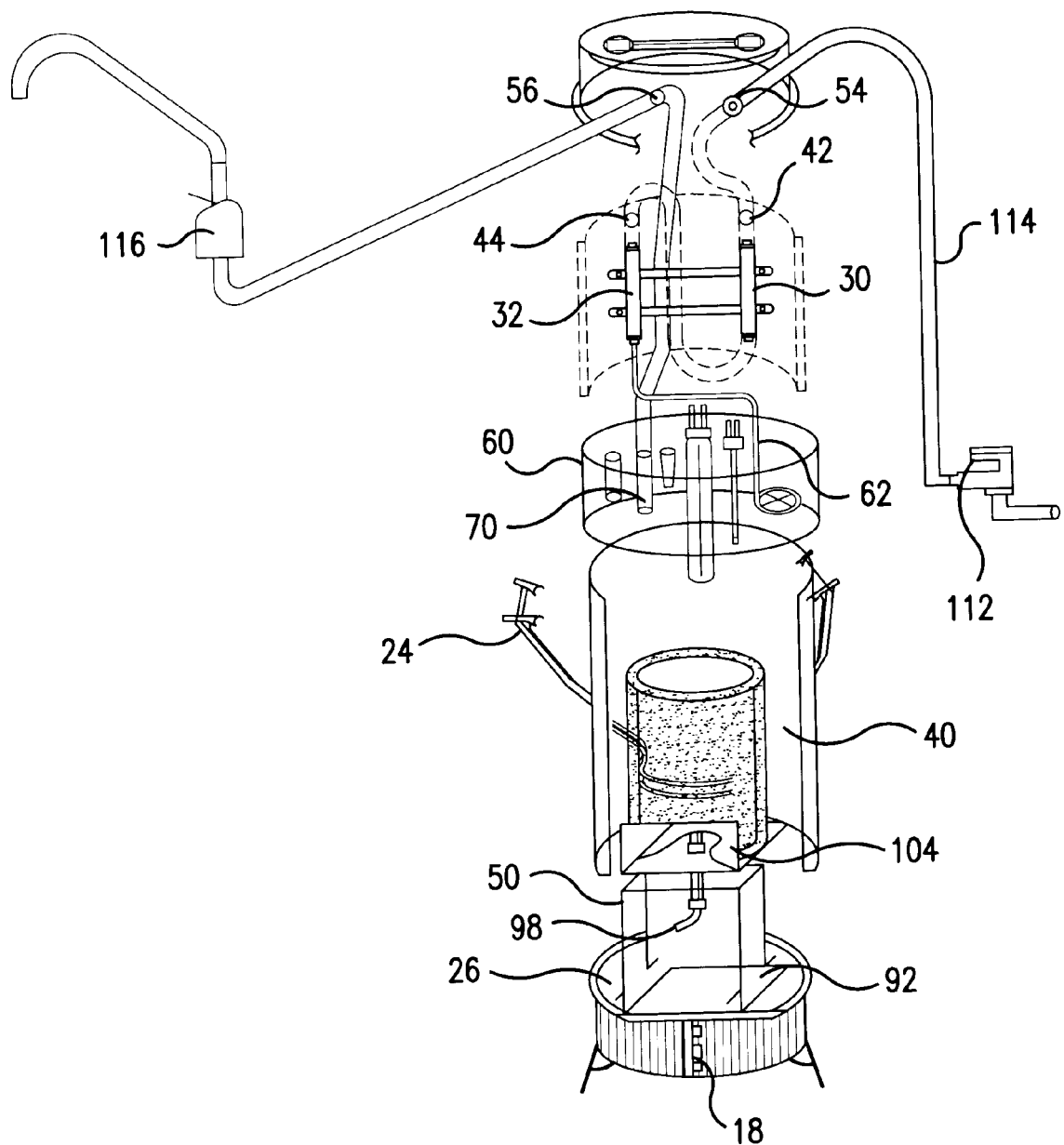
FIG. 6 is a rear perspective view of the hydraulic branching system, it demonstrates all the different steps of filtration, purification and distribution of the water.

The temperature of water is adjusted by means of a probe installed in the reservoir 80 and a thermostat 102 placed to the rear of the machine. In FIG. 6, water is provided to the station, we can activate the manual valve 112 that brings the water from the faucet of the house or an external reservoir by means of a pump in the case of a portable version. Utilization of electric valves is also possible for the present invention to get the water.

According to the user's choice, water can follow different ways, therefore water has to pass in all cases by the filtration system, except conditioned water 12 liters (3 gallons) or 18 liters (5 gallons) or more that is directly conducted to the sterilization and refrigeration room by a very simple change of tubing of the point 42 to the point 62. If the present invention uses house water, it must pass by the purification system then by the sterilization system that uses essentially an ultraviolet lamp. Finally it goes through the refrigeration system.

The purification system includes a sediment filter, carbon media filter that have a life span of 1 year or 3780 liters, a measure device can be installed together with the filters to determine their usury degree. The sterilization system is based on the use of a lamp giving out an ultraviolet artificial light oriented toward the water in the reservoir that has to be sterilized, the ultraviolet light is produced by a bass pressure mercury lamp whose glass permits the passage of radiations of a specific wave length. The maximal efficiency of a germicidal lamp corresponds to a length of 2537 Angstrom wave, the functioning of the ultraviolet lamp is supervised by the sensor 64.

The energy that microorganisms accumulate after exposure to the UV rays results to their elimination due to the modification of the chemical links of their DNA molecules. The germicidal strength of the system depends on the number of seconds of exposition to the UV intensity in microwatts by cmZ. The necessary germicidal intensity for the destruction of 99.9% of virus is 6800 microwatts by cmZ, of 10400 microwatts by cmZ for bacteria, and of 12100 for the unicellular mushrooms. The life span of the lamp is about 8000 hours of working In the normal conditions.

After the opening of the manual pressure regulator valve 112, water passes directly by a plastic tube 114 toward the main entrance 54 that is inserted in the lid 12, then it passes by the hole 42 toward the sediment filter 30 then to the hole 44 toward the carbon media filter 32, then toward the float 62 that is inserted in the main kit 60, this float is automatically closed after the replenishment of the reservoir by the water. After activating the station, water will be sterilized and refrigerated automatically and will be distributed thereafter toward an isolated tube toward the faucet of distribution 116 installed from afar according to needs so as to use other systems of distribution from afar. In the present invention, the ultraviolet sensor generates an appropriate signal to cause the ultraviolet light source to discontinue emitting ultraviolet radiation depending on the quality of the liquid.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A portable liquid cooler/purification station comprising:
   a housing including a reservoir therein adapted for receiving a liquid;
   a removable kit assembly including an ultraviolet light source for mounting within said housing for exposing the liquid in said reservoir to ultraviolet light for destroying bacteria disposed in said liquid, said removable kit assembly being positioned in a top portion of said housing and being removably mounted relative thereto for servicing the removable kit assembly while not requiring draining of the liquid from the housing;
   a probe mounted on said removable kit assembly for measuring the temperature of the liquid;
   an ultraviolet light sensor included in said removable kit assembly for generating an appropriate signal to cause said ultraviolet light source to discontinue emitting ultraviolet radiation depending on the quality of the liquid;
   power supply means for providing electrical power to said ultraviolet light source, said power supply means being operatively connected to said removable kit assembly to permit said removable kit assembly to be removed from the housing for servicing;
   a mechanical float for detecting the quantity of liquid in the reservoir for automatically closing after a predetermined quantity of liquid has been replenished to the reservoir;
   means for evacuation of air from the housing;
   a treated water passageway included in the removable kit assembly for the exit of treated water;
   a sediment filter and a carbon media filter being operatively connected to the removable kit for filtering the liquid, and a reverse-osmosis filter in case of polluted water; and
   a refrigeration system including a compressor for cooling the liquid.

2. The portable liquid cooler/purification station according to claim 1, wherein said power supply means for providing electrical power operates on continuous current.

3. The portable liquid cooler/purification station according to claim 1, wherein said power supply means for providing electrical power operates on alternating current.

4. The portable liquid cooler/purification station according to claim 1, wherein said power supply means for providing electrical power operates on solar power.

5. The portable liquid cooler/purification station according to claim 1, wherein the station can be totally disassembled for cleaning.

6. The portable liquid cooler/purification system according to claim 1, wherein said ultraviolet light source is immersed in liquid during operation such that said ultraviolet light source is in thermal contact.

* * * * *